United States Patent Office 3,415,623
Patented Dec. 10, 1968

3,415,623
PROCESS FOR PREPARING CONDENSED
PHOSPHOROUS ACID
Robert L. Carroll, Bridgeton, and Riyad R. Irani, St. Louis, Mo., assignors to Monsanto Company, St. Louis, Mo., a corporation of Delaware
No Drawing. Filed Apr. 19, 1965, Ser. No. 449,281
14 Claims. (Cl. 23—165)

ABSTRACT OF THE DISCLOSURE

A process is described for preparing condensed phosphorous acid by adding phosphorus trihalide to a reaction medium of water, orthophosphorous acid or mixtures of these under reaction conditions which minimize the formation of separate phases of the phosphorus trihalide and the reaction medium and under temperature conditions which are below the decomposition temperature of condensed phosphorous acid until the reaction product has a $P_4O_6$ content of from greater than 67% by weight to about 75% by weight.

This invention relates to preparing condensed phosphorous acid and, more particularly, to preparing substantially pure pyrophosphorous acid.

Condensed phosphorous acid as referred to herein is a phosphorous acid containing substantially no free water and having a $P_4O_6$ content by weight of from greater than 67% to about 75%. When the $P_4O_6$ content by weight is 75% the condensed phosphorous acid is pyrophosphorous acid. When the $P_4O_6$ content by weight is greater than 67% but less than 75% it is believed that the condensed phosphorous acid is comprised of mixtures of orthophosphorous acid and pyrophosphorous acid.

It has been reported that pyrophosphorous acid can be prepared by reacting barium pyrophosphite with a stoichiometric amount of sulfuric acid at 0° C. Additionally, pyrophosphorous acid in the crystalline form has been claimed to have been made by violent agitation of a mixture of orthophosphorous acid and phosphorus trichloride with a current of carbon dioxide at temperatures near 35° C. Both of these methods are laboratory preparative methods and are not believed suitable to be adapted for the commercial preparation of pyrophosphorous acid. It is not surprising that a commercial preparation of pyrophosphorous acid has not been advanced since, among other things, the system is concentrated, that is, a water-starved system containing substantially no free water, which results in a variety of possible phosphorus-containing compounds being formed therein. As can be appreciated, therefore, a method which can be adapted commercially for preparing pyrophosphorous acid utilizing relatively inexpensive reactants would represent an advancement in this art.

It is an object of this invention to provide an improved process for preparing condensed phosphorous acids.

It is another object of this invention to provide an improved process for preparing substantially pure pyrophosphorous acid.

It is a further object of this invention to provide an improved process which can be adapted commercially for preparing substantially pure pyrophosphorous acid by the hydrolysis of phosphorus trihalide.

It is a still further object of this invention to provide an improved process for preparing substantially pure pyrophosphorous acid in good yields and relatively short reaction times.

Further objects and advantages of this invention will become apparent from the following description.

In its broadest aspects the invention comprises preparing condensed phosphorous acid by adding phosphorus trihalide to a reaction medium selected from the group consisting of water, orthophosphorous acid and admixtures of these under reaction conditions which minimize the formation of separate phases of the reaction medium and the phosphorus trihalide, and under temperature conditions which are below the decomposition of condensed phosphorous acid, that is, below about 130° C., until the reaction product has a $P_4O_6$ content of from greater than 67% by weight to about 75% by weight, all of which will be more fully discussed hereinafter. Additionally, substantially pure pyrophosphorous acid, that is, above about 90% by weight of pyrophosphorous acid, can be prepared by the foregoing process when the reaction product has a $P_4O_6$ content of about 75% by weight.

Although condensed phosphorous acid can be prepared in the aforementioned reaction using, in general, any phosphorus trihalide as a reactant, such as phosphorus tribromide, phosphorus triiodide and the like, phosphorus trichloride appears to be the most advantageous phosphorus trihalide to use and therefore, the instant invention is primarily directed to the use of phosphorus trichloride as the preferred reactant.

As previously mentioned, the conditions of carrying out the reaction are important and especially temperature conditions and reaction conditions, such as, the rate of addition and the degree of agitation. The temperature used has an important influence on the rate of hydrolysis of the phosphorus trichloride in the reaction medium. In general, higher temperatures usually result in a faster hydrolysis rate, however, temperatures in excess of about 130° C. will tend to decompose the condensed phosphorous acid. Although, in general, any temperature less than about 130° C. is suitable, such as, for example, 0° to 30° C., it is preferred that the temperature be maintained above the melting point of pyrophosphorous acid, that is, above 40° C. since the hydrolysis rate is much slower when the pyrophosphorous acid is to any appreciable degree, in the solid form. When preparing condensed phosphorous acids containing a $P_4O_6$ content of greater than 67% by weight but less than about 70% by weight, it is preferred ot maintain the temperature above about 75° C. (the melting point of orthophosphorous acid) in order to maintain a more desired hydrolysis rate and, therefore, a preferred temperature is from about 75° C. to about 130° C. When preparing condensed phosphorous acid having a $P_4O_6$ content above about 70% by weight, it is preferred that temperatures from about 40° C. to about 70° C. be maintained during the reaction.

As previously mentioned, reaction conditions, such as, the rate of addition and degree of agitation are important since these conditions are inter-related to the extent that when using a particular rate of addition of the phosporus trihalide to the reaction medium sufficient agitation should be used to achieve and/or maintain a relatively homogeneous reactant mixture in order to prevent or minimize the phosphorus trihalide and reaction medium from forming separate phases during the hydrolysis reaction. It has been found that if these conditions are not controlled, along with the particular temperature used, unhydrolyzed phosphorus trihalide will tend to separate from the reaction medium as a separate phase and, although the hydrolysis reaction continues, a relatively insoluble polymeric material believed to be a polymeric form of phosphorus and/or oxides of phosphorus and/or chlorine is formed which not only is an objectionable contaminate but which, in some cases, causes the reaction to become uncontrollable and oftentimes violent to the degree that there is danger of an explosion of the reaction mass. The formation of the polymeric material can readily be detected while carrying out the reaction since this objectionable contaminant is usually an orange or yellow tainted material. Since the addition rate and degree of agitation can be varied, it is usually desired, in order to prevent the aforementioned phase separation of the reactants, to use a rate of addition and degree of agitation which does not allow the concentration of the phosphorus trihalide in the reactant mixture to be above about 5% by weight of the reactants. Concentrations as low as about 0.001% by weight of the reactants and even lower can be used, although such is usually not desirable due to the extended length of time necessary for the desired product to be prepared, with the concentration of phosphorus trihalide maintained in the reaction mixture of from about 0.01% to about 1% by weight of the reactants being preferred. In particular, in order to maintain the foregoing desired concentration it has been found that an addition rate of less than about .2 mole of phosphorus trihalide per minute is suitable under an agitation rate sufficient to prepare a good dispersion of the reactant mixture and, particularly, addition rates of less than about 0.001 mole of phosphorus trihalide per minute can be used although from about 0.001 to 0.1 mole of phosphorus trihalide per minute are preferred.

As previously mentioned, the reaction medium to which the phosphorus trihalide is added in preparing condensed phosphorus acid can be either water, orthophosphorous acid or an aqueous solution of orthphosphorous acid. The use of water as a reactant is especially advantageous due to the availability and inexpensiveness of this reactant. Although, orthophosphorous acid can be used as a reactant it is preferable to use an aqueous solution of orthophosphorous acid as a reactant and any concentration of orthophosphorous acid is suitable. Concentrations below about 95% by weight are preferred and especially concentrations of from about 1% to about 85%.

The reaction can be carried out by many and various methods. For example, in a batch process, the reaction medium can be charged to a suitable reaction vessel equipped with a stirrer and the phosphorous trihalide added either continuously or intermittently to the reaction medium under agitation and preferably below the surface thereof to avoid loss of the phosphorus trihalide reactant. Or, in some cases, if desired, the phosphorus trihalide can be added to the reaction medium batch either continuously fed into a suitable reaction vessel with the rate of feed of the reaction medium and the rate of addition of the reaction medium to achieve the degree of homogeneity required in order to prevent phase separation of the reactants. Another method which can be used is a continuous method whereby the reaction medium is continuously fed into a suitable reaction vessel with the rate of the reaction medium and the rate of addition of the phosphorus trihalide to the reaction medium being controlled with the degree of agitation and temperature used to insure the continuous withdrawal of the desired product. In the foregoing methods, temperature control means are preferred due to the initial exothermic nature of the reaction believed due to the heat of solution of the by-product hydro-halide acid (HCl) until the solution is saturated with HCl followed by the reaction becoming endothermic in order to form the condensed phosphorous acid.

An important aspect of this invention is that the desired products, condensed phosphorous acids, contain substantially no hydro-halide acid by-product, that is, less than about 1% by weight, since the by-product hydro-halide acids are not soluble in the condensed phosphorous acid and can be removed, when suitable temperatures are used for the reaction, as vapors during the hydrolysis reaction. However, if condensed phosphorous acid further purified with respect to the hydro-halide acid by-product is desired, such can be achieved by, for example, heating the condensed phosphorous acid under vacuum and/or treatment of the condensed phosphorous acid under heat by an inert gas or air if temperature conditions are used which do not decompose the condensed phosphorous acid.

The condensed phosphorous acid and/or substantially pure pyrophosphorous acid can find utility as such or, in some cases, can be still further purified with respect to the desired component of the condensed phosphorous acid by, for example, fractional crystallization since the melting point of orthophosphorous acid is about 75° C. and the melting point of pyrophosphorous acid is about 38° C. Additionally, if desired, the condensed phosphorous acid and/or substantially pure pyrophosphorous acid can be neutralized with various alkaline materials such as the alkali metal hydroxides, carbonates and the like (NaOH, KOH, $Na_2CO_3$, $K_2CO_3$) to form the corresponding salts.

The following examples are presented to illustrate the invention with parts and percentages by weight being used unless otherwise indicated.

EXAMPLE I

Into a 4-necked flask equipped with a stirrer, thermometer, condenser, and dropping funnel are charged about 90 parts of water (5 moles) which are heated to the indicated temperature. About 275 parts of $PCl_3$ (2 moles) are added to the reaction medium (water) under the surface thereof by way of the dropping funnel at the indicated average rate of addition with sufficient agitation (high dispersion stirrer variable between 300 to 1,000 r.p.m.) to prevent a phase separation of the $PCl_3$ and the reaction medium. The temperature of the hydrolysis reaction is maintained as indicated by an ice bath and/or heating mantel. The following table presents the results of several reactions conducted at various temperatures and/or average addition rates.

TABLE 1

| | Temp. (°C) | Average addition rate (mole $PCl_3$/min.) | Reaction completion time (hrs.) | Products (n.m.r. analyses) | |
|---|---|---|---|---|---|
| | | | | Percent $H_3PO_3$ | Percent $H_4P_2O_5$ |
| 1 | 50 | 0.0065 | ~6.5 | 2 | 98 |
| 2 | 80 | 0.01 | ~3 | 10 | [1] 90 |
| 3 | 80 | 0.01 | ~3 | 15 | [1] 85 |
| 4 | 80 | 0.01 | ~3 | 6 | 94 |
| 5 | 80 | 0.03 | ~1 | | 100 |

[1] The $PCl_3$ was introduced from the dropping funnel above the reaction medium and for run 2 about 9.5 ml. $PCl_3$ (5.1%) and for run 3 about 10.2 ml. $PCl_3$ (5.6%) was caught in Dry Ice-acetone trap.

EXAMPLE II

Into a reaction vessel as described in Example I are charged about 144 parts of water (8 moles) which is heated to about 70° C. About 411 parts of $PCl_3$ (3 moles) are added to the reaction medium (water) under the surface thereof at an average rate of addition of about 0.01 mole $PCl_3$/min. by way of the dropping funnel with sufficient agitation to prevent a phase separation of the $PCl_3$ and the reaction medium. The temperature of the hydrolysis reaction is maintained at about 70° C. by an ice bath and/or heating mantel. At the end of about 5 hours the resulting condensed phosphorous acid analyzes as about 70% by weight $P_4O_6$ by adding sufficient water to hydrolyze the pyrophosphorous acid to orthophosphorous acid and determining $P_4O_6$ content by iodometric titration which compares favorably with n.m.r. analysis of about 50% by weight orthophosphorous acid and about 50% by weight pyrophosphorous acid.

EXAMPLE III

Into a reaction vessel as described in Example I are charged about 120 parts of a 70% by weight aqueous solution of orthophosphorous acid which is heated to about 65° C. About 137 parts of $PCl_3$ are added to the reaction medium under the surface thereof at an average rate of addition of about 0.03 mole $PCl_3$/min. by way of the dropping funnel with sufficient agitation to prevent a phase separation of the $PCl_3$ and the reaction medium. The temperature of the hydrolysis reaction is maintained at about 65° C. by an ice bath and/or heating mantel. At the end of about 1½ hours the resulting substantially pure pyrophosphorous acid analyzes as about 75% $P_4O_6$ by adding sufficient water to hydrolyze the pyrophosphorous acid to orthophosphorous acid and determining the $P_4O_6$ content by iodometric titration which compares favorably with n.m.r. analysis of about 5% by weight of orthophosphorous acid and about 95% by weight of pyrophosphorous acid.

Results comparable to the foregoing examples can also be obtained in preparing condensed phosphorous acid or substantially pure pyrophosphorous acid using other phosphorus trihalides as reactants, such as phosphorus tribromide, phosphorus triiodide and the like under substantially similar reaction conditions.

What is claimed is:

1. A process for preparing condensed phosphorous acid which comprises adding phosphorus trihalide to a reaction medium selected from the group consisting of water, orthophosphorous acid and mixtures of these under reaction conditions wherein the concentration of the phosphorus trihalide reactant during the reaction does not exceed about 5% by weight of the reactants and under temperature conditions which are below the decomposition temperature of condensed phosphorous acid until the reaction product has a $P_4O_6$ content of from greater than 67% by weight to about 75% by weight.

2. The process of claim 1, wherein said temperature conditions are from about 40° C. to about 130° C.

3. The process of claim 2, wherein said phosphorus trihalide reactant is phosphorus trichloride.

4. The process of claim 3, wherein said temperature conditions are from about 75° C. to about 130° C.

5. The process of claim 4, wherein the concentration of the phosphorus trichloride reactant during the hydrolysis reaction is from about 0.01% to about 1% by weight of the reactants.

6. A process for preparing condensed phosphorous acid which comprises adding phosphorus trichloride to a reaction medium selected from the group consisting of water, orthophosphorous acid and mixtures of these at an addition rate of less than .2 mole of phosphorus trichloride per minute under agitation sufficient to maintain the concentration of the phosphorus trichloride reactant during the reaction below about 5% by weight of the reactants and under temperature conditions of from about 40 to 130° C. until the reaction product has a $P_4O_6$ content greater than 67% by weight to about 75% by weight.

7. The process of claim 6, wherein said addition rate is from about 0.001 to 0.1 mole of phosphorus trichloride per minute.

8. A process for preparing substantially pure pyrophosphorous acid which comprises adding phosphorus trihalide to a reaction medium selected from the group consisting of water, orthophosphorous acid and mixtures of these under reaction conditions wherein the concentration of the phosphorus trihalide reactant during the reaction does not exceed about 5% by weight of the reactants and under temperature conditions which are below about 130° C. until the reaction product has a $P_4O_6$ content of about 75% by weight.

9. The process of claim 8, wherein said temperature conditions are from about 40° C. to about 130° C.

10. The process of claim 9, wherein said phosphorus trihalide reactant is phosphorus trichloride.

11. The process of claim 10, wherein said temperature conditions are from about 40° C. to about 70° C.

12. The process of claim 11, wherein the concentration of the phosphorus trichloride reactant during the hydrolysis reaction is from about 0.01 to about 1% by weight of the reactants.

13. A process for preparing substantially pure pyrophosphorous acid which comprises adding phosphorus trichloride to a reaction medium selected from the group consisting of water, orthophosphorous acid and mixtures of these at an addition rate of less than .2 mole of phosphorus trichloride per minute under agitation sufficient to maintain a concentration of the phosphorus trichloride reactant during the reaction below about 5% by weight of the reactants and under temperature conditions of from about 40° C. to 70° C. until the reaction product has a $P_4O_6$ content of about 75% by weight.

14. The process of claim 13, wherein said addition rate is from about 0.001 to 0.1 mole of phosphorus trichloride per minute.

References Cited

UNITED STATES PATENTS 2,684,286    5/1954    Krieger.

OTHER REFERENCES

Chimie Minerale, Academie des Sciences, pp. 814–815.

Babor et al., General College Chem., third edition (1956) p. 428 relied on.

Perry, Editor, Chemical Engineers Handbook, third edition (1950) pp. 1196 and 1197 relied on.

OSCAR R. VERTIZ, *Primary Examiner.*

A. J. GREIF, *Assistant Examiner.*

PO-1050
(5/69)

UNITED STATES PATENT OFFICE
CERTIFICATE OF CORRECTION

Patent No. 3,415,623      Dated December 10, 1968

Inventor(s) Robert L. Carroll & Rivad R. Irani

It is certified that error appears in the above-identified patent and that said Letters Patent are hereby corrected as shown below:

Column 2, line 34, after the word "example," and before the word "to", "0°" should read -- 20° --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents